United States Patent [19]

Setbacken

[11] Patent Number: 5,670,781
[45] Date of Patent: Sep. 23, 1997

[54] PHOTOELECTRICAL ENCODER

[75] Inventor: Robert Setbacken, Santa Barbara, Calif.

[73] Assignee: Renco Encoders, Inc., Goleta, Calif.

[21] Appl. No.: 598,479

[22] Filed: Feb. 8, 1996

[51] Int. Cl.[6] .................................................. G01D 5/347
[52] U.S. Cl. ........................ 250/231.16; 250/237 G
[58] Field of Search .................... 250/237 G, 231.16, 250/231.13

[56]  References Cited

U.S. PATENT DOCUMENTS

| | | | |
|---|---|---|---|
| 4,840,488 | 6/1989 | Kabay et al. | 356/374 |
| 5,534,693 | 7/1996 | Koudo et al. | 250/237 G |
| 5,539,519 | 7/1996 | Takagi et al. | 356/356 |

OTHER PUBLICATIONS

Mori M.; Kizaki Y.; Saito M. (member IEEE); & Hongu A., A Fine Pitch COG Technique for a TFT-LCD Panel Using an Indium Alloy, IEEE Transactions on Components, Hybrids, and Manufaturing Technology, vol. 16, No. 8, 852–857 (Dec. 1993).

*Primary Examiner*—Edward P. Westin
*Assistant Examiner*—Alan L. Giles
*Attorney, Agent, or Firm*—Anderson, Kill & Olick, P.C.

[57] ABSTRACT

An encoder including a scale and a light source for illuminating the scale, and a sensing device displaceable relative to the scale in a measuring direction for generating measuring signals, with the sensing device including a transparent carrier provided with a scanning grating, photosensors for converting a position-dependent modulated light into electrical scanning signals defining the measuring signals, and strip conductors provided on a surface of the transparent carrier for forming an electrical connection with the photosensors.

9 Claims, 3 Drawing Sheets

PHOTOELECTRICAL ENCODER

BACKGROUND OF THE INVENTION

The present invention relates to a photoelectrical encoder including a measuring standard, a light source for illuminating the measuring standard, and a sensing device displaceable relative to the measuring standard in a measuring direction for generating measuring signals, with the sensing device including a transparent carrier provided with a scanning grating and photosensors for converting a position-dependent modulated light into electrical scanning signals defining the measuring signals.

Such encoders are particularly used in machine-tools for measuring a relative position between a tool and a machined workpiece, and in coordinate-measuring machines for determining the position and dimensions of a test object. In this encoder, the measuring standard, displaceable relative to a scanning device, is illuminated by light from a light source, with the light being modulated due to the relative movement between the measuring standard and the scanning device, and with the modulated light being detected by the photosensors. The photosensors generate position-dependent electrical scanning signals which are then processed in a known manner by appropriate evaluation means, in particular, interpolation means, and a computer, e.g., microprocessor.

U.S. Pat. No. 4,840,488 discloses a photoelectrical encoder having a compact scanning unit. As shown in FIG. 10 of this patent, this is achieved by providing the scanning grating on one side of a transparent carrier and the photosensors on the other side of the carrier. The photosensors are supported on a stable lead frame. The photosensors are electrically connected to respective leads or conductive portions of the frame and, thereafter, integrally molded together with a respective portion of the frame. Only then, the sensors are mounted on the grating carrier. A drawback of this arrangement consists in that each photosensor should be properly positioned relative to the frame which, in turn, should be properly positioned relative to the carrier. In addition, such a lead frame is difficult to produce.

To eliminate this drawback, the German publication DE-40 06 789 suggests mounting of the sensors on a common semiconductor substrate, with the scanning grating being provided directly on the outer surface of the photosensors. The semiconductor substrate of DE-40 06 789 also includes other electrical circuits, such as a pre-amplifier, an output signal comparator, or a light source regulator.

The drawback of the encoder of DE-40 06 789 consists in that the semiconductor substrate with the scanning grating provided thereon should be individually produced in order to correspond to the grating period of the scanned measuring standard. It is well known that the grating period of the scanning grating should correspond to the grating period of the measuring standard. Another drawback of the encoder of DE-40 06 789 consists in that the surface of the photosensors, on which the scanning grating is provided, should be preliminary chemically treated. The chemical treatment adversely affects the electrical characteristics of the semiconductor substrate.

Accordingly, an object of the invention is a photoelectrical encoder which can be produced in a simple and cost-effective manner.

SUMMARY OF THE INVENTION

This and other objects of the invention, which will become apparent hereinafter, are achieved by providing on the transparent carrier, which carries the scanning grating and the photosensors, strip conductors electrically connected with the photosensors.

The advantage of the invention consists in that the sensing device of the encoder can be produced by using conventional methods of semiconductor technology. The important feature of the present invention consists in that the photosensors can be produced without taking into the consideration the graduation of the scanned scale and can, thus, be acquired as a mass-produced article. Further, their precise mounting on the carrier is not necessary. The only thing that need be produced individually, taking into the consideration the scale graduation, is the scanning grating of the scanning reticle, which can be produced very cost-effectively independently of the scale graduation. The connection of the scanning reticle with the photosensors can be achieved by simple means, with the scanning reticle also functioning as a printed circuit board.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
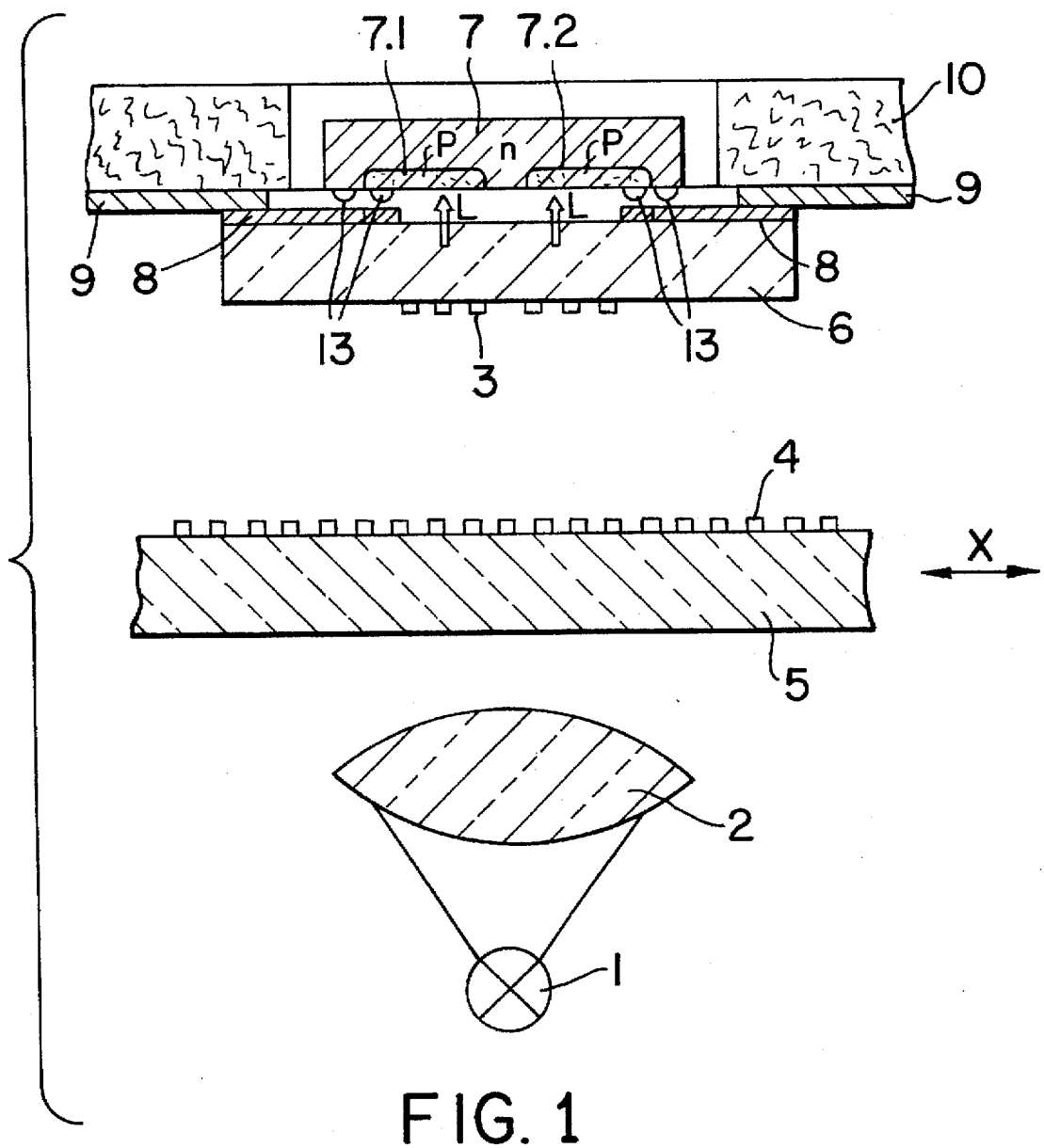
FIG. 1 shows schematically a cross-sectional view of an encoder according to the present invention.

The encoder according to the present invention, which is schematically shown in FIG. 1, includes a light source 1, a collimating lens 2, a scanning device 3, and a scale 4 located between the collimating lens 2 and the scanning device 3. The light from the light source 1 is modulated by a relative movement between the scanning device 3 and the scale 4 in the measuring direction X. The scale 4 is formed as an incremental graduation consisting of alternating opaque and transparent lines provided on the surface of a transparent scale carrier 5 made of glass.

The scanning grating 3 is likewise formed as an incremental grating of alternating opaque and transparent lines. According to the invention, the scanning grating 3 is provided on the surface of a transparent carrier 6. The carrier 6 also carries photosensors 7.1–7.4 for receiving the modulated light L. The photosensors 7.1–7.4 are in electrical contact with the conductors 8 provided in the carrier 6. The electrical contact of the photosensors 7.1–7.4 with the conductors 8 insures mechanical attachment of the photosensors 7.1–7.4 to the carrier 6.

The photosensors 7.1–7.4 are built-in in a common semiconductor substrate 7. In the shown embodiment, the four photosensors 7.1–7.4 all have a light-sensitive pn-junction. For obtaining a pn-junction, conventional processes of the semiconductor technology are used. The semiconductor substrate 7 is formed of conventional materials used in the semiconductor technology, e.g., germanium (Ge), silicium (Si), gallium arsenide (GaAs), gallium-aluminum arsenide (GaAlAs), or indium phosphite (InP). When a pn-junction is exposed to light rays, the electromagnetic radiation L is transformed into electrical signals. The semiconductor substrate 7 advantageously also includes an integrated circuit 7.5 for processing the generated electrical signals. The circuit 7.5 can be formed, e.g., as an amplifier, a comparator, a digitizer or an interpolation circuit. The circuit 7.5 in the shown embodiment is formed as an amplifier.

The semiconductor substrate 7 has electrical contacts 13 facing the surface of the carrier 6 opposite to that on which the grating 3 is provided. The substrate-carrying surface of the carrier 6 includes strip conductors 8 which are in a direct electrical contact with the connection contacts 13 of the substrate 7. The strip conductor 8 are formed as film strip by conventional lithographical processes such as vapor-deposition, sputtering and/or electroplating. The contact of the connection contacts 13 with the strip conductors 8 is provided, advantageously, by soldering, in particular, by reflow soldering, or by using an electroconductive glue. The connection contacts 13 are sometimes called bonding pads and are provided with conducive bumps, e.g., gold bumps. All of the connection contacts 13, which contact the strip conductors 8, are provided on the light-sensitive side of the photosensors 7.1–7.4 and directly face the strip conductors 8. This contacting method is known in the field "chip-on-glass" of the electrical technique as a "flip-chip" method.

The flip-chip technology involves mounting of the semiconductor structural elements or chips directly on a printed circuit board, without using any casings or auxiliary carriers. With this method, mounting of the chips on the printed circuit board can be effected in a very simple manner, and a very stable assembly is obtained.

Figure 2:
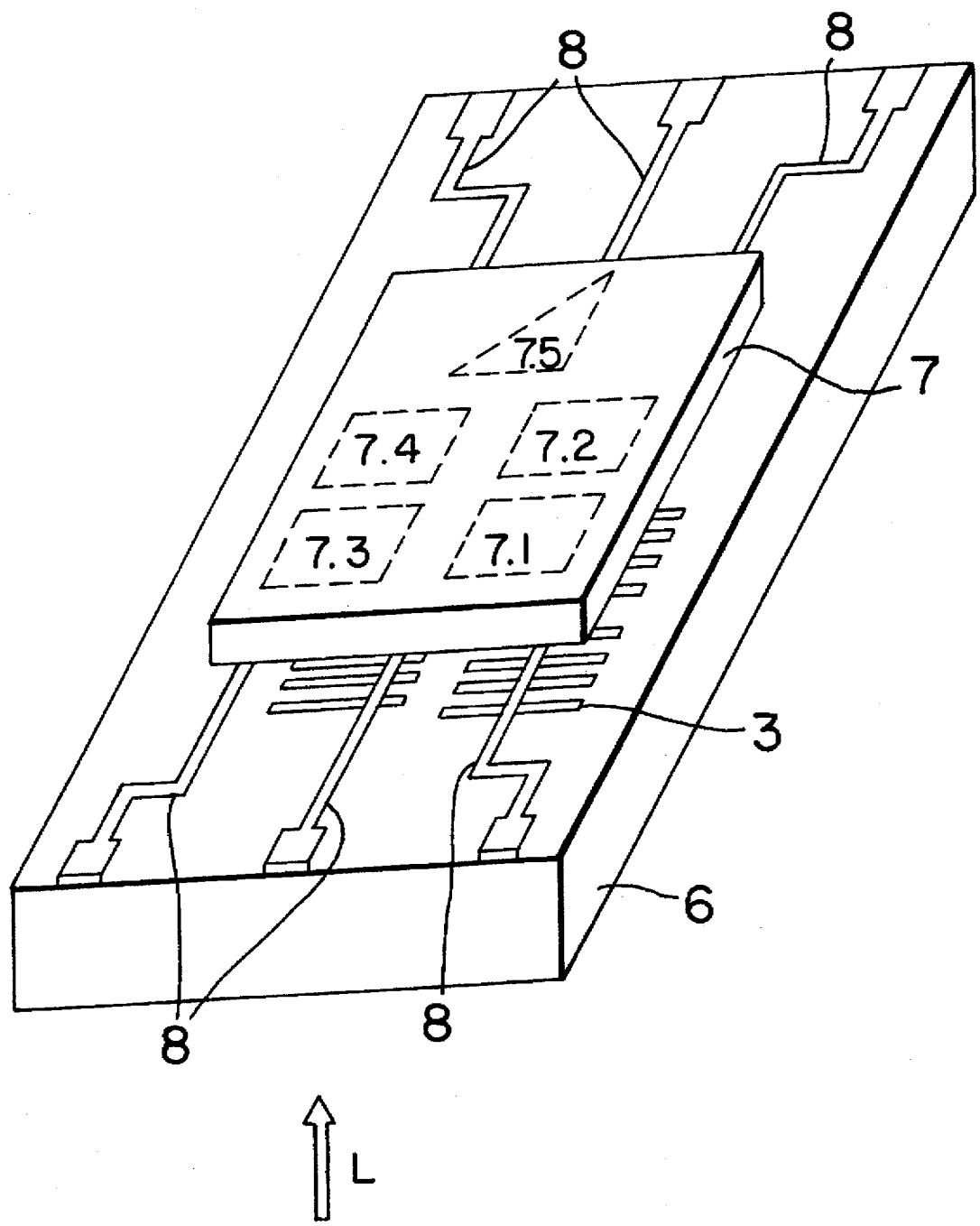
FIG. 2 shows schematically a sensing device including photosensors, scanning reticle and scanning grating shown in FIG. 1 but at an increased scale.

The sensor device shown in FIG. 2 includes a transparent carrier 6, the scanning grating 3, the strip conductors 8, and the semiconductor substrate 7 with photosensors 7.1–7.4 and the integrated circuit 5. At that, the strip conductors 8 of the carrier 6 are also used for providing an electrical connection with strip conductors 9 of the printed circuit board 10.

Figure 3:
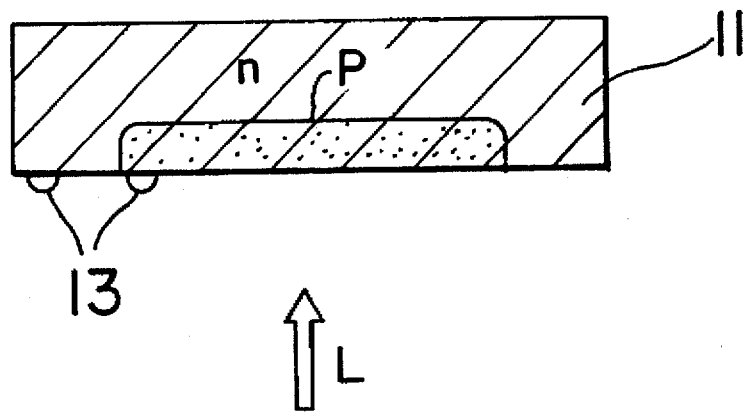
FIG. 3 shows a cross-sectional view of a photodiode used in the sensing device of an encoder according to the present invention.
Figure 4:
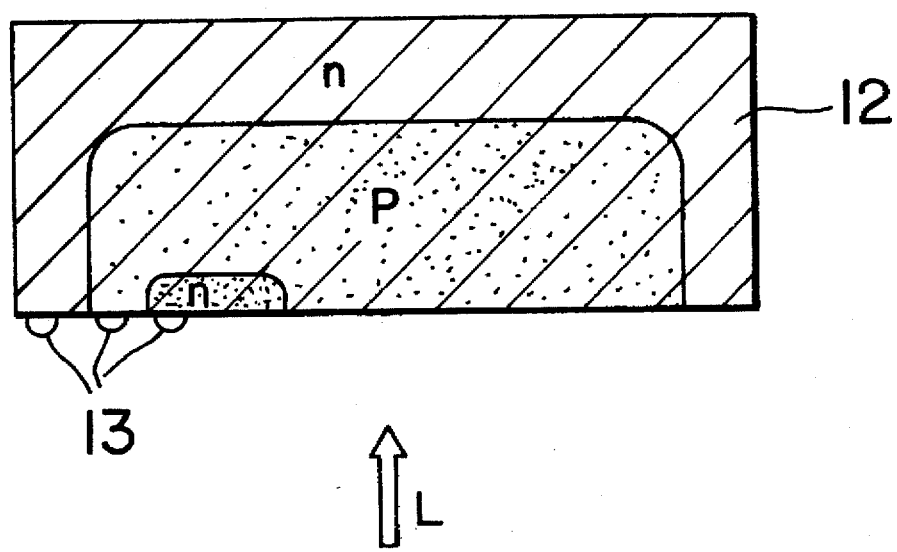
FIG. 4 show a cross-sectional view of a phototransistor used in a sensing device of an encoder according to the present invention.

The photosensors 7.1–7.4 are advantageously photodiodes or phototransitors. Instead of a common semiconductor substrate 7 with several photodiodes or phototransistors, several separate photosensors can be mounted on the carrier 6 as separate structural elements. Such separate elements are shown in FIGS. 3 and 4. FIG. 3 shows a photodiode 11 with a light-sensitive pn-junction and two connection contracts 13. FIG. 4 shows a phototransistor 12 having a known structure with three connection contracts 13.

As shown in FIGS. 1–4, independent of whether photosensors 7.1–7.4, or photodiodes 11, or phototransitors 12 are used, all the connection contacts 13 are always provided on the light-sensitive side of the used elements. The advantage of this consists in that no wire connections are necessary.

In the embodiment shown in FIGS. 1 and 2, the photosensors 7.1–7.4 and the strip conductors 8 are provided on a side of the carrier 6 opposite to the side on which the scanning grating 3 is provided. This arrangement is particularly advantageous because it permits to maintain the distance between the scanning grating 3 and the measuring standard 4 small, which is necessary for small grating periods of the scanning grating and the grating of the measuring standard 4. However, the scanning grating 3 can also be provided on the side of the carrier 6 on which the strip conductors 8 are provided.

The scanning grating 3 consists of four groups, with the graduation of separate groups having an opposite phase shift of 90°. Each group consists of a plurality of opaque line extending in the measuring direction X and spaced from each other. The opaque lines of each group face the light-sensitive surface of a corresponding photosensor 7.1–7.4

The carrier 6 is formed of a transparent mylar, plastic or any other transparent material.

The present invention can be used in photoelectrical linear and angular encoders in which the scanning of the measuring standard is effected by using either scanning by light transmission or scanning by light reflection. At that the measuring standard can be formed using incremental technique or absolute technique.

Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. An encoder, comprising
   a scale having a graduation;
   a light source-for illuminating the scale; and
   a sensing device displaceable relative to the scale in a measuring direction for generating position-dependent measuring signals;
   wherein the sensing device includes a transparent carrier provided with a scanning grating and photosensors arranged behind the scanning grating for converting a position-dependent modulated light into electrical signals defining the position-dependent measuring signals,
   wherein strip conductors are provided directly on a surface of the transparent carrier for forming an electrical connection with the photosensors, and
   wherein the photosensors each have electrical connection contacts which are provided on a light-sensitive side thereof and which are located opposite to and in an electrical contact with respective strip conductors.

2. An encoder as set forth in claim 1, wherein the photosensors are mechanically attached to the carrier by an electrical connection with the carrier.

3. An encoder as set forth in claim 1, wherein the sensing device is located on a side of the scale opposite to a side illuminated by the light source, and wherein the scanning grating is provided on a side of the transparent carrier facing the scale, and the photosensors are arranged on an opposite side of the transparent carrier.

4. An encoder as set forth in claim 1, wherein surface regions of the respective photosensors are arranged in path of light rays, wherein the respective surface regions of the strip conductors are provided at a side of the carrier remote from a light source and are likewise arranged in the light ray path, and wherein the connection contacts face the surface regions of the respective strip conductors.

5. An encoder as set forth in claim 1, wherein the scanning grating is provided on a surface of the carrier which is opposite to the surface on which strip conductors are provided.

6. An encoder as set forth in claim 1, wherein the photosensors are supported on a common semiconductor substrate.

7. An encoder as set forth in claim 6, wherein the semiconductor substrate includes an integrated circuit for processing electrical scanning signals.

8. An encoder as set forth in claim 1, wherein the transparent carrier is formed of glass.

9. An encoder as set forth in claim 1, wherein the scanning grating and the strip conductors are provided on the carrier by coating.

* * * * *

REEXAMINATION CERTIFICATE (4167th)

United States Patent [19]
Setbacken

[11] B1 5,670,781
[45] Certificate Issued Oct. 10, 2000

[54] PHOTOELECTRICAL ENCODER

[75] Inventor: Robert Setbacken, Santa Barbara, Calif.

[73] Assignee: Renco Encoders, Inc., Goleta, Calif.

Reexamination Request:
No. 90/005,029, Jun. 29, 1998

Reexamination Certificate for:
Patent No.: 5,670,781
Issued: Sep. 23, 1997
Appl. No.: 08/598,479
Filed: Feb. 8, 1996

[51] Int. Cl.[7] .................................................. G01D 5/347
[52] U.S. Cl. ................................ 250/231.16; 250/237 G
[58] Field of Search ...................... 250/231.13, 231.14, 250/231.16, 237 G, 208.1; 356/356, 363, 373

[56] References Cited

U.S. PATENT DOCUMENTS 4,687,928  8/1987  Thurston .
5,471,515  11/1995  Fossum et al. ............................ 377/60
5,574,559  11/1996  Kaneda et al. ....................... 250/237 G
5,841,126  11/1998  Fossum et al. ....................... 250/208.1
5,841,133  11/1998  Omi .................................... 250/237 G

FOREIGN PATENT DOCUMENTS 0548848  6/1993  European Pat. Off. .
0564683  10/1993 European Pat. Off. .
0589477  3/1994  European Pat. Off. .

*Primary Examiner*—Que T. Le

[57] ABSTRACT

An encoder including a scale and a light source for illuminating the scale, and a sensing device displaceable relative to the scale in a measuring direction for generating measuring signals, with the sensing device including a transparent carrier provided with a scanning grating, photosensors for converting a position-dependent modulated light into electrical scanning signals defining the measuring signals, and strip conductors provided on a surface of the transparent carrier for forming an electrical connection with the photosensors.

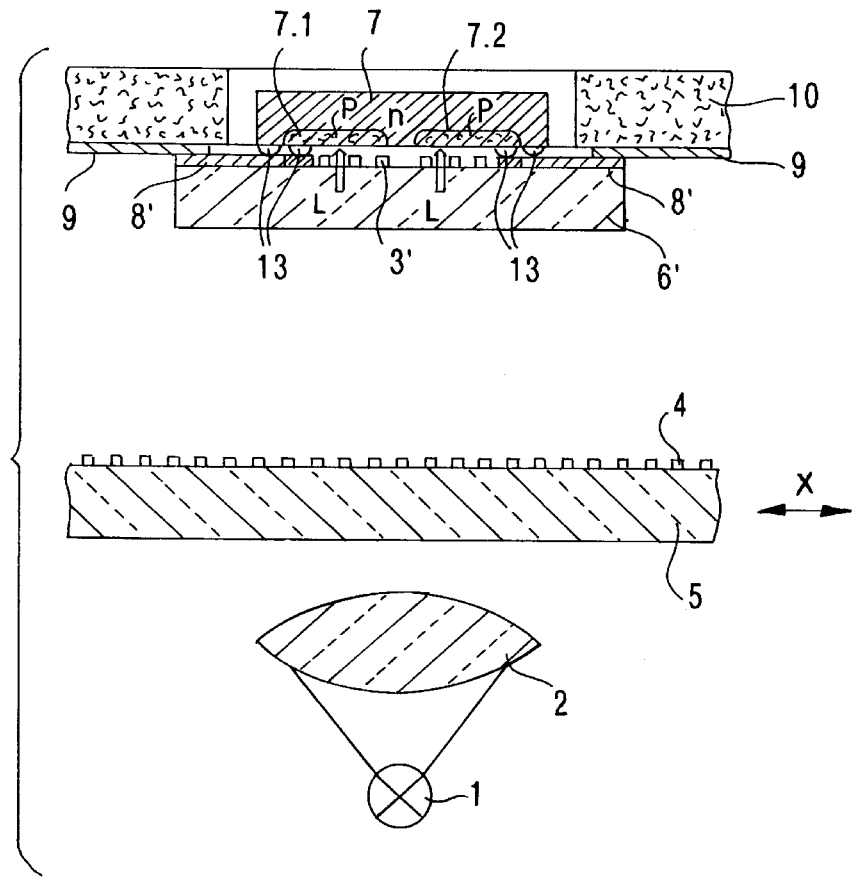

(new)

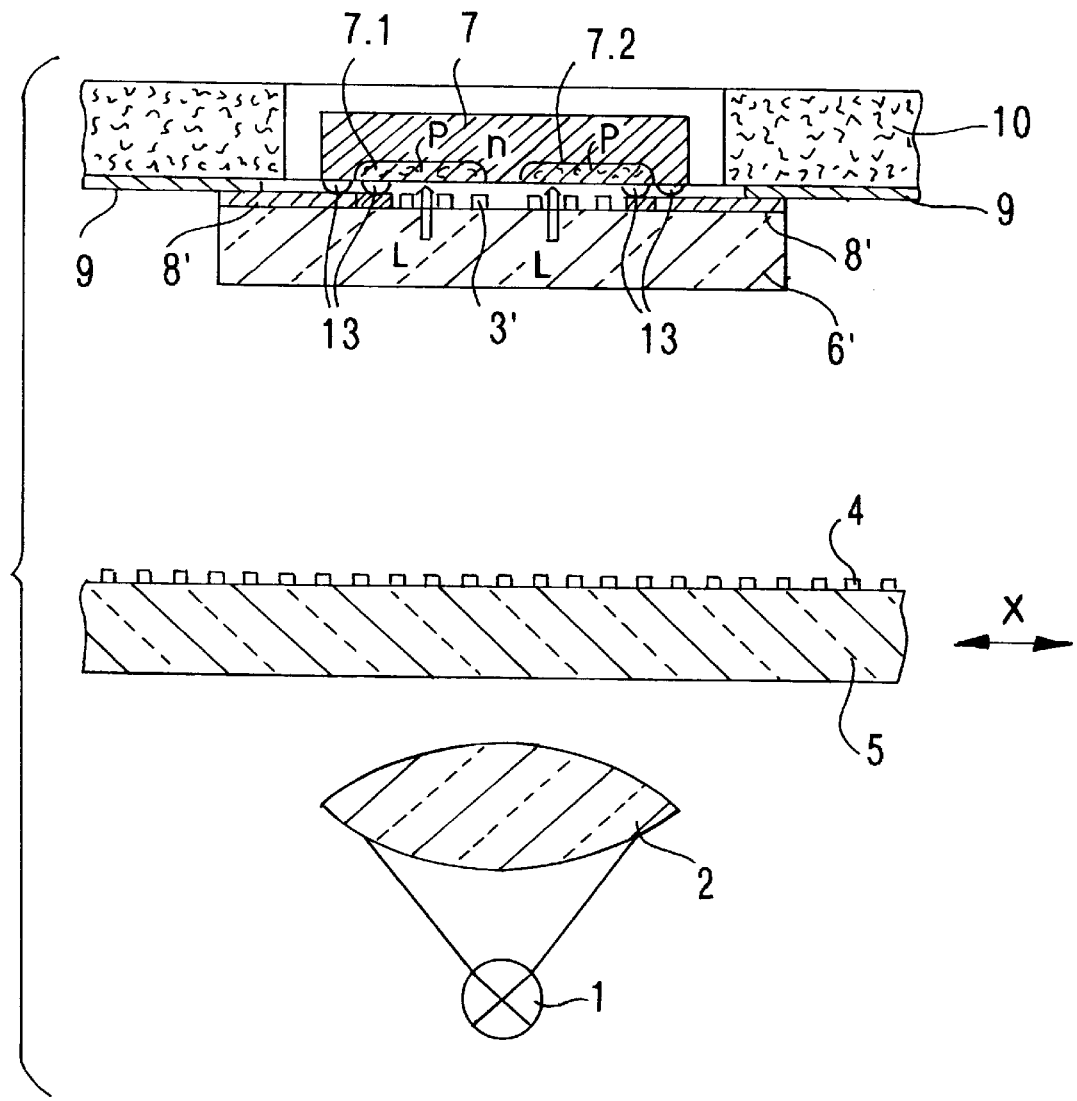
Fig.5 (new)

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 2, lines 28–34:

FIG. 3 shows a cross-sectional view of a photodiode used in the sensing device of an encoder according to the present invention; [and]

FIG. 4 shows a cross-sectional view of a phototransistor used in a sensing device of an encoder according to the present invention[.]; and

*FIG. 5 shows a view similar to that of FIG. 1 but with an alternative embodiment of the transparent carrier.*

Column 3, lines 49–59:

In the embodiment shown in FIGS. 1 and 2, the photosensors 7.1–7.4 and the strip conductors 8 are provided on a side of the carrier 6 opposite to the side on which the scanning grating 3 is provided. This arrangement is particularly advantageous because it permits to maintain the distance between the scanning grating 3 and the measuring standard 4 small, which is necessary for small grating periods of the scanning grating and the grating of the measuring standard 4. However, the scanning grating [3] *3¹* can also be provided on the side of the carrier [6] *6¹* on which the strip conductors [8] *8¹* are provided, *as shown in FIG. 5*.

THE DRAWING FIGURES HAVE BEEN CHANGED AS FOLLOWS:

New FIG. 5 has been added.

AS A RESULT OF REEXAMINATION, IT HAS BEEN DETERMINED THAT:

Claims 1 and 6–8 are cancelled.

Claims 2–5 and 9 are determined to be patentable as amended.

New claims 10–20 are added and determined to be patentable.

2. An encoder as set forth in claim [1] *10*, wherein the photosensors are mechanically attached to the carrier by an electrical connection with the carrier.

3. An encoder as set forth in claim [1] *10*, wherein the sensing device is located on a side of the scale opposite to a side illuminated by the light source, and wherein the scanning grating is provided on a side of the transparent carrier facing the scale, and the photosensors are arranged on an opposite side of the transparent carrier.

4. An encoder as set forth in claim [1] *10*, wherein surface regions of the respective photosensors are arranged in path of light rays, wherein the respective surface regions of the strip conductors are provided at a side of the carrier remote from a light source and are likewise arranged in the light ray path, and wherein the connection contacts face the surface regions of the respective strip conductors.

5. An encoder as set forth in claim [1] *10*, wherein the scanning grating is provided on a surface of the carrier which is opposite to the surface on which strip conductors are provided.

9. An encoder as set forth in claim [1] *10*, wherein the scanning grating and the strip conductors are provided on the carrier by coating.

*10. An encoder, comprising a scale having a graduation;*

*a light source for illuminating the scale; and*

*a sensing device displaceable relative to the scale in a measuring direction for generating position-dependent measuring signals;*

*wherein the sensing device includes a transparent carrier formed of glass and provided with a scanning grating, photosensors arranged behind the scanning grating for converting a position-dependent modulated light into electrical signals defining the position-dependent measuring signals, and an integrated circuit for processing the electrical signals and arranged on the transparent carrier,*

*wherein strip conductors are provided directly on a surface of the transparent carrier for forming an electric connection with the photosensors,*

*wherein the photosensors each have electrical connection contacts which are provided on a light-sensitive side thereof and which are located opposite to and in an electric contact with respective strip conductors, and*

*wherein the integrated circuit and the photosensors are arranged on a same surface of a common semiconductor substrate.*

*11. An encoder as set forth in claim 10, wherein the integrated circuit is formed as one of amplifier, comparator, digitizer, and an interpolation circuit.*

*12. An encoder as set forth in claim 10, wherein the grating consists of four groups, wherein the graduations of separate groups have an opposite phase shift of 90°, and wherein each group includes a plurality of spaced from each other opaque lines extending in the measuring direction and arranged opposite a light-sensitive surface of a respective photosensor.*

*13. An encoder, comprising*

*a scale having a graduation;*

*a light source-for illuminating the scale; and*

*a sensing device displaceable relative to the scale in a measuring direction for generating position-dependent measuring signals;*

*wherein the sensing device includes a transparent carrier provided with a scanning grating and photosensors arranged behind the scanning grating for converting a position-dependent modulated light into electrical signals defining the position-dependent measuring signals,*

*wherein strip conductors are provided directly on a surface of the transparent carrier for forming an electrical connection with the photosensors,*

*wherein the photosensors each have electrical connection contacts which are provided on a light-sensitive side thereof and which are located opposite to and in an electrical contact with respective strip conductors, and*

*wherein the grating is provided on the surface of the carrier on which the strip conductors are provided.*

14. An encoder as set forth in claim 13, wherein the grating and the strip conductors are provided on the carrier by coating.

15. An encoder as set forth in claim 13, wherein the grating consists of four groups, wherein the graduations of each of the four groups have a phase shift of 90° with respect to graduations of an adjacent group, and wherein each group includes a plurality of spaced from each other opaque lines extending in the measuring direction and arranged opposite a light-sensitive surface of a respective photosensor.

16. An encoder as set forth in claim 13, wherein the carrier is formed of glass.

17. An encoder as set forth in claim 13, wherein the photosensors are supported on a common semiconductor substrate.

18. An encoder as set forth in claim 17, further comprising an integrated circuit for processing the electrical signals and supported on the common substrate.

19. An encoder as set forth in claim 18, wherein the integrated circuit is formed as one of an amplifier, comparator, digitizer, and an interpolation circuit.

20. An encoder, comprising a scale having a graduation, a light source for illuminating the scale; and
a sensing device displaceable relative to the scale in a measuring direction for generating position-dependent measuring signals;

wherein the sensing device includes a transparent carrier provided with a scanning grating, photosensors arranged behind the scanning grating for converting a position-dependent modulated light into electrical signals defining the position-dependent measuring signals, and an integrated circuit for processing the electrical signals and arranged on the transparent carrier, wherein strip conductors are provided directly on a surface of the transparent carrier for forming an electrical connection with the photosensors, wherein the photosensors each have electrical connection contacts which are provided on a light-sensitive side thereof and which are located opposite to and in an electric contact with respective strip conductors, and wherein the grating and the strip conductors are provided on and same surface of the carrier.

* * * * *